(12) United States Patent
Kismarton

(10) Patent No.: US 9,302,427 B2
(45) Date of Patent: *Apr. 5, 2016

(54) AEROPSPACE STRUCTURE INCLUDING COMPOSITE BEAM CHORD CLAMPED BETWEEN REINFORCEMENT PLATES

(75) Inventor: Max U. Kismarton, Renton, WA (US)

(73) Assignee: The Boeing Company, Chicago, IL (US)

( * ) Notice: Subject to any disclaimer, the term of this patent is extended or adjusted under 35 U.S.C. 154(b) by 828 days.

This patent is subject to a terminal disclaimer.

(21) Appl. No.: 12/871,262

(22) Filed: Aug. 30, 2010

(65) Prior Publication Data

US 2010/0320320 A1    Dec. 23, 2010

Related U.S. Application Data

(63) Continuation-in-part of application No. 12/777,250, filed on May 10, 2010, now Pat. No. 8,201,371, which is a continuation-in-part of application No. 11/096,743, filed on Mar. 31, 2005, now Pat. No. 7,721,495, and a continuation-in-part of application No. 12/340,631, filed on Dec. 19, 2008, now Pat. No. 7,807,249, which is a continuation-in-part of application No. 11/096,727, filed on Mar. 31, 2005, now abandoned.

(51) Int. Cl.
*E04C 1/00* (2006.01)
*B29C 65/00* (2006.01)
(Continued)

(52) U.S. Cl.
CPC ............... *B29C 66/45* (2013.01); *B29C 43/24* (2013.01); *B29C 65/562* (2013.01); *B29C 65/72* (2013.01); *B29C 66/304* (2013.01); *B29C 66/721* (2013.01); *B29C 66/7212* (2013.01); *B29C 66/72141* (2013.01); *B29C 66/742* (2013.01); *B29C 70/24* (2013.01); *B29C 70/545* (2013.01); *B32B 3/266* (2013.01); *B32B 5/022* (2013.01); *B32B 5/06* (2013.01); *B32B 5/12* (2013.01);
(Continued)

(58) Field of Classification Search
CPC ............. B29C 66/45; B29C 66/72141; B29C 66/7212; B29C 66/304; B29C 43/24; B29C 65/72; B32B 7/08; B32B 15/20; B32B 15/14; B32B 5/06; B32B 5/022; B32B 5/26; B32B 5/22; B32B 5/12; B32B 3/266; B64C 1/065
USPC ........ 52/126.1, 309.16, 578, 592.6, 831, 837, 52/841; 248/188.2; 428/298.1, 299.1, 428/299.4, 105, 107, 109, 113, 292.1, 428/293.1; 244/123, 119, 133; 442/218, 442/268, 269, 271, 277, 278
See application file for complete search history.

(56) References Cited

U.S. PATENT DOCUMENTS 3,768,760 A    10/1973    Jensen
3,975,916 A    8/1976    Watson
(Continued)

FOREIGN PATENT DOCUMENTS

EP    1707702    10/2006

OTHER PUBLICATIONS

IP Australia, Patent Examination Report No. 1, AU 2011253392 (Jan. 7, 2016).
Official action, CA 2,797,195 (Jul. 6, 2015).

*Primary Examiner* — Mark Wendell
(74) *Attorney, Agent, or Firm* — Walters & Wasylyna LLC

(57) ABSTRACT

A structure for an aerospace vehicle includes a composite beam chord clamped between first and second metal plates. The beam chord is clamped at a force that precludes or reduces beam chord delamination under axial loading during operation of the vehicle.

21 Claims, 9 Drawing Sheets

(51) Int. Cl.

| | | |
|---|---|---|
| *B29C 43/24* | (2006.01) | |
| *B29C 65/56* | (2006.01) | |
| *B29C 65/72* | (2006.01) | |
| *B29C 70/24* | (2006.01) | |
| *B29C 70/54* | (2006.01) | |
| *B32B 5/12* | (2006.01) | |
| *B32B 15/14* | (2006.01) | |
| *B64C 1/06* | (2006.01) | |
| *E04C 3/29* | (2006.01) | |
| *B32B 5/02* | (2006.01) | |
| *B32B 5/06* | (2006.01) | |
| *B32B 5/22* | (2006.01) | |
| *B32B 5/26* | (2006.01) | |
| *B32B 7/08* | (2006.01) | |
| *B32B 15/20* | (2006.01) | |
| *B32B 3/26* | (2006.01) | |
| *B29C 65/08* | (2006.01) | |
| *B29K 105/10* | (2006.01) | |
| *B29K 105/16* | (2006.01) | |
| *B29K 283/00* | (2006.01) | |
| *B29K 307/00* | (2006.01) | |
| *B29K 307/02* | (2006.01) | |
| *B29K 309/04* | (2006.01) | |
| *B29K 309/08* | (2006.01) | |
| *B29K 705/00* | (2006.01) | |
| *B29L 31/30* | (2006.01) | |

(52) U.S. Cl.
CPC ... *B32B 5/22* (2013.01); *B32B 5/26* (2013.01); *B32B 7/08* (2013.01); *B32B 15/14* (2013.01); *B32B 15/20* (2013.01); *B64C 1/065* (2013.01); *E04C 3/29* (2013.01); *B29C 65/08* (2013.01); *B29C 66/7392* (2013.01); *B29C 66/7394* (2013.01); *B29K 2105/101* (2013.01); *B29K 2105/162* (2013.01); *B29K 2277/10* (2013.01); *B29K 2283/00* (2013.01); *B29K 2307/00* (2013.01); *B29K 2307/02* (2013.01); *B29K 2309/04* (2013.01); *B29K 2309/08* (2013.01); *B29K 2705/00* (2013.01); *B29L 2031/3082* (2013.01); *B32B 2260/021* (2013.01); *B32B 2260/04* (2013.01); *B32B 2260/046* (2013.01); *B32B 2262/0269* (2013.01); *B32B 2262/10* (2013.01); *B32B 2262/101* (2013.01); *B32B 2262/103* (2013.01); *B32B 2262/106* (2013.01); *B32B 2307/50* (2013.01); *B32B 2307/546* (2013.01); *B32B 2307/718* (2013.01); *B32B 2605/18* (2013.01); *Y02T 50/433* (2013.01)

(56) References Cited

U.S. PATENT DOCUMENTS

| | | | | |
|---|---|---|---|---|
| 4,120,998 | A | * 10/1978 | Olez | 428/33 |
| 4,177,306 | A | * 12/1979 | Schulz et al. | 428/107 |
| 4,734,146 | A | * 3/1988 | Halcomb et al. | 156/148 |
| 4,741,943 | A | * 5/1988 | Hunt | 428/113 |
| 5,064,439 | A | * 11/1991 | Chang et al. | 264/255 |
| 5,429,326 | A | 7/1995 | Garesche | |
| 5,735,486 | A | * 4/1998 | Piening et al. | 244/124 |
| 5,866,272 | A | * 2/1999 | Westre et al. | 428/593 |
| 6,114,050 | A | * 9/2000 | Westre et al. | 428/608 |
| 6,355,337 | B1 | * 3/2002 | Piening et al. | 428/223 |
| 6,355,584 | B1 | * 3/2002 | Corrons | 442/367 |
| 6,565,944 | B1 | 5/2003 | Hartness | |
| 6,641,893 | B1 | 11/2003 | Suresh | |
| 6,703,118 | B2 | * 3/2004 | van Weperen et al. | 428/295.4 |
| 2004/0213952 | A1 | * 10/2004 | Takemura et al. | 428/105 |
| 2009/0104398 | A1 | 4/2009 | Kismarton | |

\* cited by examiner

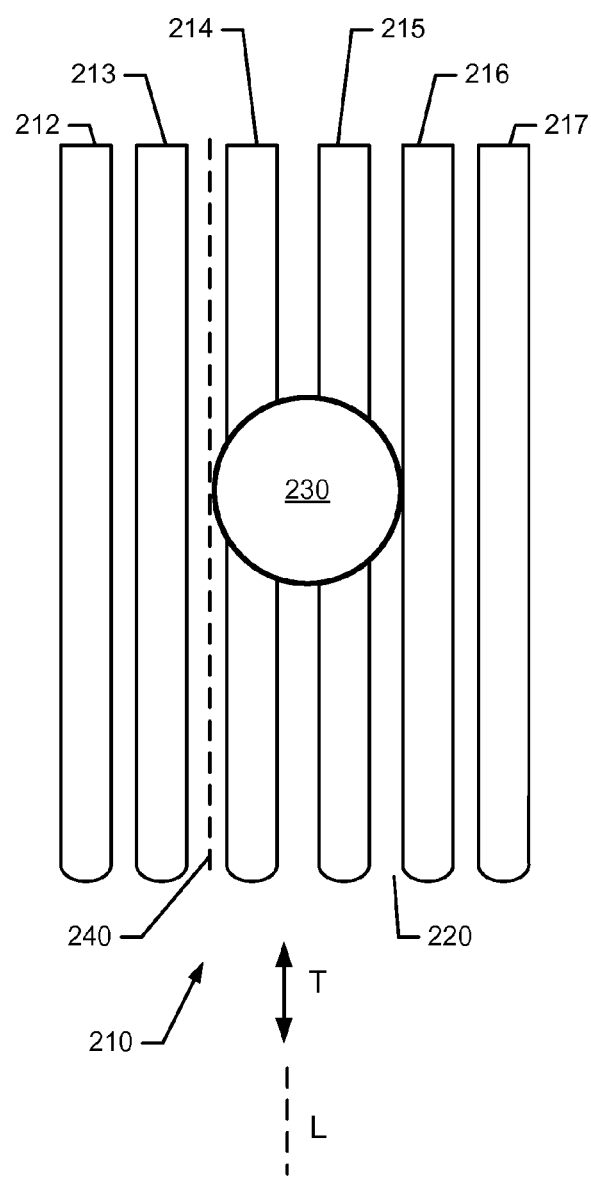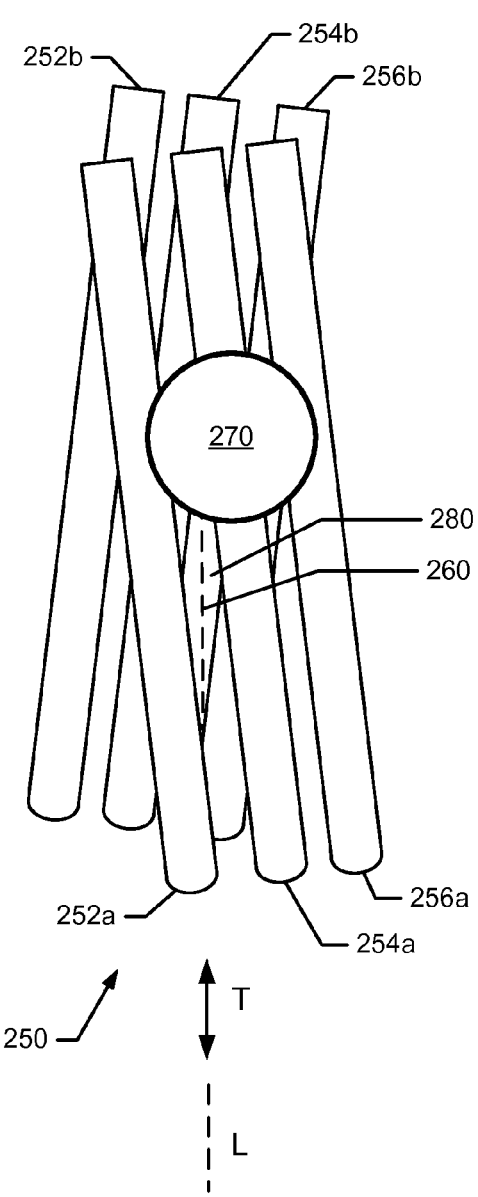

AEROPSPACE STRUCTURE INCLUDING COMPOSITE BEAM CHORD CLAMPED BETWEEN REINFORCEMENT PLATES

This is a continuation-in-part of U.S. Ser. No. 12/777,250 filed 10 May 2010 now U.S. Pat. No. 8,201,371. U.S. Ser. No. 12/777,250 is a continuation-in-part of U.S. Ser. No. 11/096,743 filed 31 Mar. 2005, now U.S. Pat. No. 7,721,495 and also U.S. Ser. No. 12/340,631 filed 19 Dec. 2008, now U.S. Pat. No. 7,807,249. U.S. Ser. No. 12/340,631 is a continuation-in-part of U.S. Ser. No. 11/096,727 filed 31 Mar. 2005 and now abandoned.

FIELD

The present invention relates to aerospace structures including beams.

BACKGROUND

Carbon fiber reinforced plastic (CFRP) is being used in place of metal, especially in applications where relatively low weight and high mechanical strength are desirable. Structures made of carbon fiber reinforced plastic are desirable for commercial and military aircraft.

For aircraft structures subject to extreme loading conditions, however, all-metal composition is still favored. One such structure is a keel beam, which is a longitudinally oriented structural member that imparts flexural stiffness to the fuselage, particularly where the landing gear is located and where the wing assemblies of the aircraft are joined to the fuselage.

It would be desirable to use composite materials in keel beams and other aerospace structures subject to extreme loading conditions.

SUMMARY

According to an embodiment herein, a structure for an aerospace vehicle comprises a composite beam chord clamped between first and second metal plates. The beam chord is clamped at a force that precludes or reduces beam chord delamination under axial loading during operation of the vehicle.

According to another embodiment herein, an aerospace vehicle comprises a fuselage, and wing assemblies coupled to the fuselage. At least one of the fuselage and the wing assemblies includes a structure having a beam chord clamped between first and second metal plates at a force that precludes or reduces delamination of the beam chord under axial loading during operation of the vehicle.

According to another embodiment herein, a fuselage comprises a keel beam including a beam chord clamped between first and second metal plates at a force that precludes or reduces delamination of the beam chord under service conditions.

BRIEF DESCRIPTION OF THE DRAWINGS

FIG. 2a is an illustration of fibers oriented at 0 degrees with respect to a longitudinal axis of a beam chord with a hole drilled in the middle.

FIG. 2b is an illustration of fibers oriented at ±α degrees with respect to a longitudinal axis of a beam chord with a hole drilled in the middle.

DETAILED DESCRIPTION

Figure 1A:
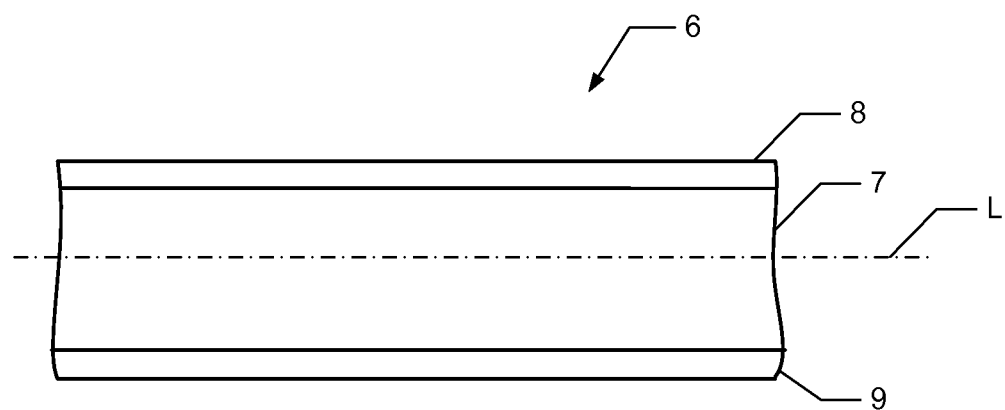
FIG. 1a is an illustration of an structure including a composite beam chord clamped between reinforcement plates.

Reference is made to FIG. 1a, which illustrates a structure 6 including a composite beam chord 7 between first and second reinforcement plates 8 and 9. The structure 6 may be primarily uni-axially loaded along the axis L. The structure 6 may also have some twist and transverse loading during usage.

The beam chord 7 is not limited to any particular geometry. In some embodiments, the beam chord 7 may have a solid cross-sectional shape such as rectangular, square, or I-beam shape. In other embodiments, the beam chord 7 may have a hollow cross-sectional shape such as a round tubular or square tubular shape. In some embodiments, the beam chord 7 may be straight. In other embodiments, the beam chord 7 may be curved and/or tapered.

The beam chord 7 is clamped between the reinforcement plates 8 and 9 at a force that precludes or reduces delamination of the beam chord 7 (e.g., impact delamination at the free edge or normal impact at the face of the plies) under axial loading. This, in turn, prevents compressive sublaminate buckling.

The reinforcement plates 8 and 9 serve several other important functions. The reinforcement plates 8 and 9 provide protection against impact damage to the beam chord 7. The reinforcement plates 8 and 9 also improve load transfer properties. The reinforcement plates 8 and 9 also boost the compression strength of the composite plies by preventing impact damage. Metal plates also provide electrical paths to handle current return network, and lightning strike and electrostatic discharge functions.

The reinforcement plates 8 and 9 may be made of any suitable material. In some embodiments, the reinforcement plates 8 and 9 may be made of a metal such as aluminum or titanium. In other embodiments, the reinforcement plates 8 and 9 may be carbon graphite plates. The reinforcement plates 8 and 9 may cover the entire surface of the beam chord 7 or only a portion of the beam chord 7.

The beam chord 7 includes multiple plies of reinforcing fibers embedded in a matrix. The reinforcing fibers and matrix are not limited to any particular composition. Examples for the fibers include, but are not limited to, carbon, fiberglass, Kevlar, boron, or titanium. Examples of the matrix include, but are not limited to, plastic and metal. As a first example, carbon fibers are embedded in a plastic matrix. As a second example, carbon fibers are embedded in a titanium matrix. In some embodiments, the carbon fibers may be intermediate modulus carbon fibers (e.g., carbon fibers having a modulus of 40 MSI).

Some embodiments of the beam chord 7 may have as few as three plies. Other embodiments may have hundreds or thousands of plies Reference is now made to FIG. 1b, which illustrates an arrangement of plies 7a-7d of the composite beam chord 7. The ply arrangement includes a first ply 7a of reinforcing fibers that are oriented at an angle +$\alpha$ degrees with respect to a longitudinal axis L of the beam chord 7, a second ply 7b of reinforcing fibers that are oriented at an angle −$\alpha$ degrees with respect to the longitudinal axis, a third ply 7c of reinforcing fibers that are oriented at an angle +$\alpha$ degrees, and a fourth ply 7d of reinforcing fibers that are oriented at an angle −$\alpha$ degrees. More generally, odd-numbered plies have reinforcing fibers oriented at +$\alpha$ degrees and even-numbered plies have reinforcing fibers oriented at −$\alpha$ degrees.

In some embodiments, each ply has fibers oriented in the same direction. In other embodiments, one or more of the plies may have fibers oriented at both angles +$\alpha$ and −$\alpha$ degrees. In some embodiments, different plies might have different values of $\alpha$.

The reinforcing fibers oriented at ±$\alpha$ degrees provide strength in tension and compression along the axis L. In some embodiments, the angle $\alpha$=0 degrees is used to provide maximum strength along the axis L. In other embodiments, angle $\alpha$ is between 2 and 12 degrees to suppress or delay ply splitting.

Figure 1B:
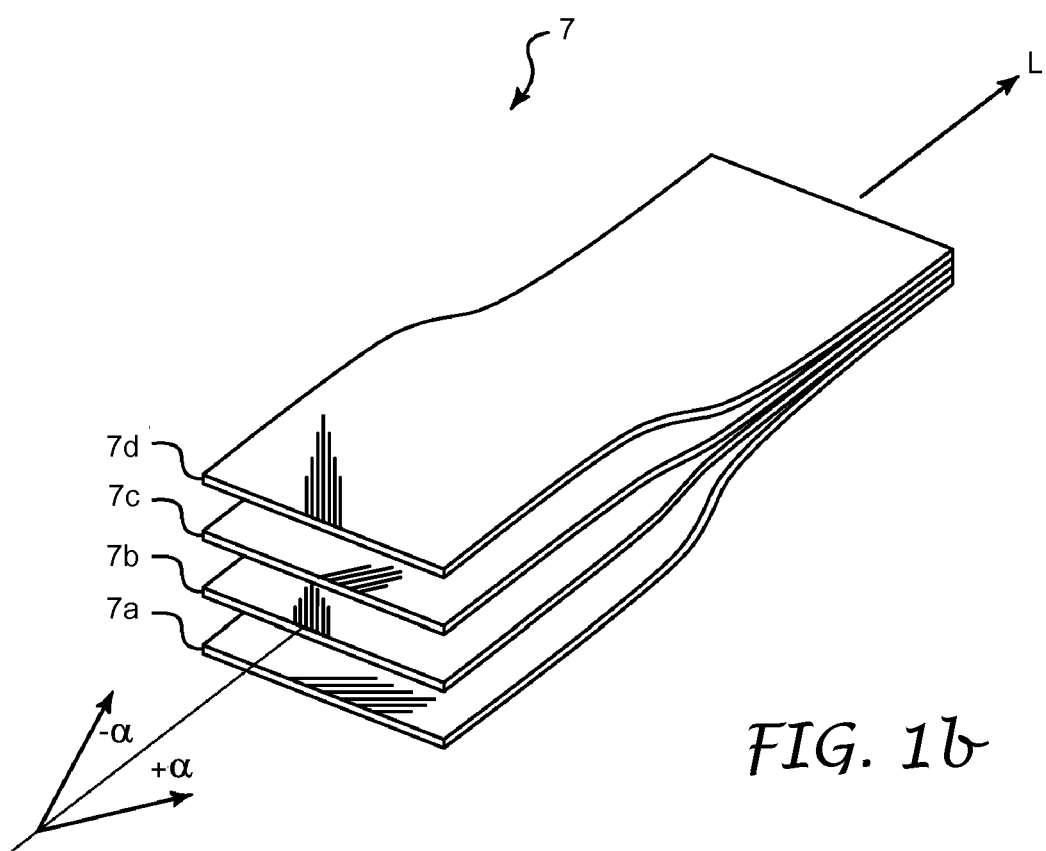
FIG. 1b is an illustration of a plurality of plies of a beam chord with fibers oriented at ±α degrees.

Although FIG. 1b illustrates a beam chord 7 having four plies of fibers, the beam chord 7 is not so limited. Additional plies of reinforcing fibers oriented at ±$\alpha$ degrees may be provided to increase strength in tension and compression along the axis L. Additional plies of reinforcing fibers oriented at other angles (later referred to as ±$\beta$) may be provided to increase shear, transverse, and bearing strength and/or stiffness.

Different arrangements may be grouped together. For example, a beam chord 7 includes a plurality of fiber groups. The plies in each group correspond to an arrangement of fibers at different orientations. The groups may be applied in any desired combination and may be repeated to any desired degree.

To fasten the reinforcement plates 8 and 9 to the beam chord 7, holes may be formed in the beam chord 7, and fasteners inserted through the holes. These holes may be perpendicular to the plies and extend through the plies.

When the structure 6 is loaded uni-axially along the longitudinal axis L (e.g., the beam is placed in compression), the fibers oriented at $\alpha$ between 2 and 12 degrees suppress or delay ply splitting that would otherwise be caused by the holes. The splitting of a ply will be suppressed or delayed by a factor of 10 to 100 times relative to a laminate having a majority of fibers oriented at $\alpha$=0 degrees. Boosting the splitting resistance by 1 to 3 orders of magnitude makes such laminates far more practical.

Reference is now made to FIGS. 2a and 2b, which illustrate ply splitting. FIG. 2a illustrates a single ply 210 having six fibers 212 to 217 embedded in a matrix 220. The fibers 212 to 217 are oriented at 0 degrees with respect to axis L. Fibers 214 and 215 are cut by drilling a hole 230. When a tensile load is applied along axis L, the uncut fibers 212, 213 and 216, 217 carry the load and stretch. The cut fibers 214 and 215 do not carry the load, do not stretch, and are sheared away from the matrix 220. This, in turn, weakens the resin between a cut fiber 214 and an uncut fiber 213. A slender crack 240 (represented by the dash line) forms in the matrix 220 between the cut and uncut fibers 214 and 213. This crack 240 can propagate along the entire length of the ply 210. The crack 240 can occur whether a structure has one ply, five plies, tens plies, or more. The crack 240 severely degrades the strength of the structure.

FIG. 2b illustrates a layer 250 of fibers 252a to 256a oriented at −$\alpha$ degrees with respect to axis L, and fibers 252b to 256b oriented at +$\alpha$ degrees with respect to the axis L, where $\alpha$ is between 2 and 12 degrees. The layer 250 may include a single ply having fibers 252a to 256a and 252b to 256b or two unidirectional plies (one unidirectional ply having fibers 252a to 256a and another unidirectional ply having fibers 252b to 256b). If fibers 254a, 256a, 254b and 256b are cut by a hole 270, a small crack 280 will form in the layer 250, but the crack 280 will not grow in an uncontrolled manner. Instead, growth of the crack 280 will slow and promptly stop, whereby strength of the structure is retained. Moreover, due to the fiber orientation of $\alpha$ between 2 and 12 degrees, an ever increasing load will be needed to propagate the crack 280 (the angled fibers have been shown to diffuse the energy at the crack tip). Ply splitting is thus suppressed or delayed.

An angle $\alpha$ in the range of 2 to 8 degrees provides a good combination of strength and splitting suppression. For angles below 2 degrees, ply splitting increases rapidly. For angles $\alpha$ exceeding 8 degrees, axial strength drops off quickly. However, for some applications, angles up to 12 degrees will provide acceptable strength.

In some embodiments, an angle $\alpha$ in the range of 3 to 5 degrees provides a better combination of strength and splitting suppression/delay, and it also provides a margin of error against strength drop-off which can occur below $\alpha$=2 degrees and above $\alpha$=8 degrees (if fiber control is insufficient during fabrication, some fibers might be oriented at angles less than 2 degrees or greater than 8 degrees). An angle $\alpha$ of 3 degrees has been found to provide an even better combination, as it provides 1 to 2% more strength in compression.

However, the optimal value of $\alpha$ will usually be a function of several factors. These factors include, but are not limited to, the fiber, the matrix, interface bonding strength between a fiber and the matrix, fiber density, fiber length, etc. These factors also include the ability to control fiber orientation.

Some embodiments of the structure 6 may only have reinforcing fibers oriented at angles of ±$\alpha$ degrees. That is, all fibers in the structure 6 consist of reinforcing fibers at ±$\alpha$ degrees. In these embodiments, the reinforcing plates 8 and 9 provide strength and stiffness in at least one of shear, transverse and bearing.

In some embodiments of the structure 6, the number of reinforcing fibers oriented at ±$\alpha$ degrees is at least 60% of the total number of reinforcing fibers in the composite beam chord. Those embodiments may also have reinforcing fibers oriented at angles other than ±$\alpha$ degrees to increase strength or stiffness in at least one of shear, transverse and bearing modes. As a first example, in existing structures, it is customary to add additional reinforcing fibers that are oriented at a conventional 45 degrees and 90 degrees.

Figure 3:
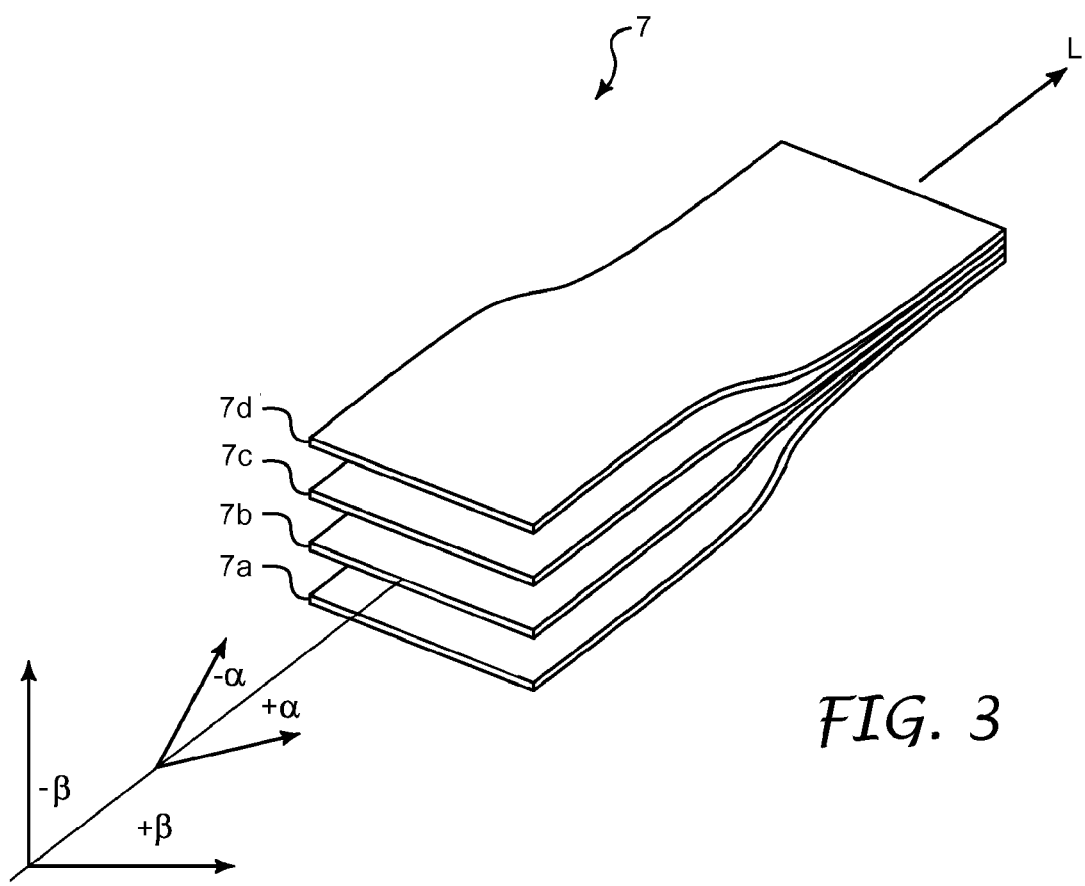
FIG. 3 is an illustration of a plurality of plies of a beam chord with fibers oriented at ±α degrees and ±β degrees.

A second example is illustrated in FIG. 3. The ply arrangement illustrated in FIG. 3 includes first and second plies 7a and 7b having fibers oriented at +$\alpha$ and −$\alpha$ degrees. The ply arrangement further includes third and fourth plies 7c and 7d having fibers oriented at ±$\beta$, where $\beta$ is between 15 and 85 degrees (e.g., ±40, ±50, ±60, ±70, ±80). In some embodiments, the range for β will be narrower, between 50 and 75 degrees. Fibers oriented at ±β degrees boost shear, transverse and bearing strength. For instance, fibers oriented at ±β degrees can be added to boost bearing strength in areas where fasteners are used to make a fastened joint or repair a joint. Since fewer ±β plies are needed to achieve same transverse strength and bearing (that is, relative to fibers oriented at 90 degrees, +45 degrees and −45 degrees), the resulting structure is more usable, tailorable, efficient and lighter.

Selective fiber orientation allows any of six characteristics to be adjusted: strength in shear, stiffness in shear, strength in transverse, stiffness in transverse, bearing strength, and bearing stiffness. If greater strength in shear is desired, a β approaching 40 or 50 degrees will be selected. If greater strength in transverse is desired, a β approaching 85 degrees will be selected. If greater strength in bearing is desired, a β approaching 65-70 degrees will be selected.

Of the total fibers oriented at ±α and ±β, only 20-30% of the total fibers at ±β are needed to reach bearing strength levels similar to traditional 0/+45/−45/90 degree hard laminates. However, unlike traditional hard laminates, where the percentage of zero degree plies is between 40 and 100%, ply splitting will be suppressed or delayed if fibers in the structure are cut and loaded.

In some embodiments, plies of the fibers oriented at ±β degrees may be interspersed with plies of the fibers oriented at ±α. Consider an example of unidirectional plies that are interspersed. The plies may have the following order: +α/−α/+β/+α/−α/−β/+α/−α/ . . . .

As for the fasteners that clamp the beam chord 7 between reinforcement plates 8 and 9 to the beam chord 7, examples include bolts, staples, z-pins, rivets, swage fasteners, and barbs. Fasteners such as bolts extend entirely through the beam chord 7. Fasteners such as staples, z-pins and barbs may extend partially into the beam chord 7. Fasteners such as staples, z-pins and barbs may be integral with the reinforcement plates 8 and 9.

Another example of a fastener is stitching. Plies of fibers may be stitched together. Stitches can be threaded through holes in a layup of dry composite plies and reinforcement plates. Resin is then infused in the structure, and the structure is cured.

In some embodiments, the fasteners are pre-tensioned, whereby the fasteners are always under tension. In other embodiments, the fasteners are post-tensioned, whereby the fasteners are under tension only when delamination occurs (that is, the delamination causes the fasteners to become tensioned).

The structure 6 may be wrapped with reinforcing fibers. For example, the structure may be wrapped with hoop-wise fibers or it may be wrapped in a cocoon of fibers. The wrapping fibers can enhance clamping, or they may be used as an alternative to fasteners.

Figure 4:
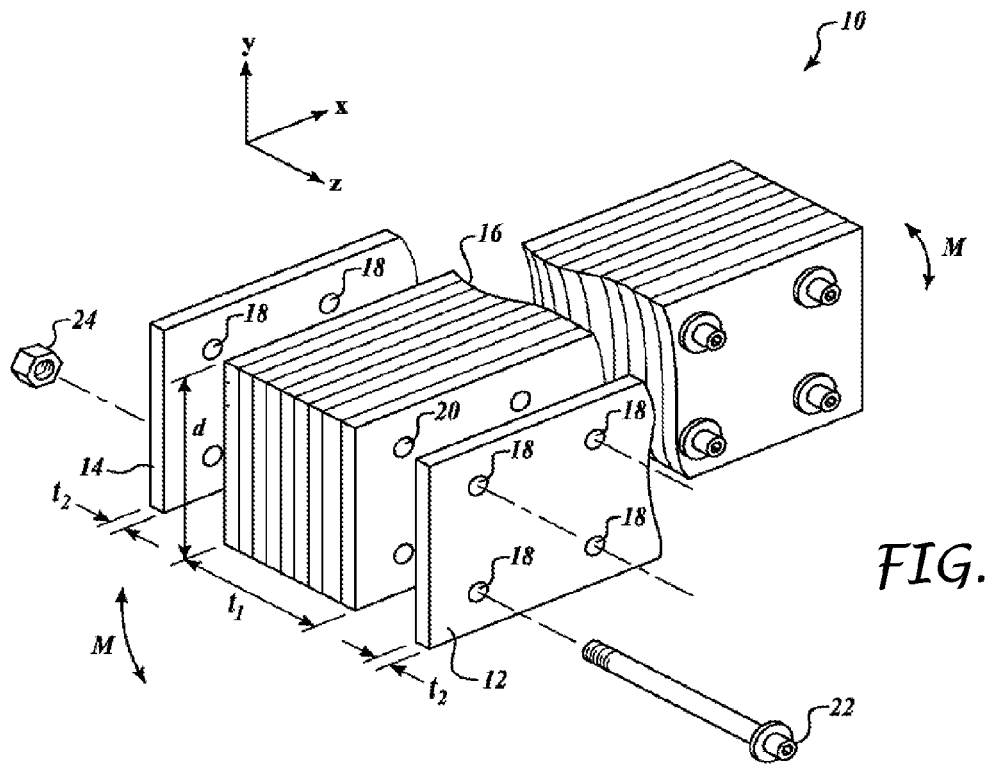
FIG. 4 is a partial exploded isometric view of a beam assembly that is fastened together by bolts.

FIG. 4 illustrates a beam assembly 10 including first and second reinforcement members 12 and 14 that are bolted to opposite sides of a central structural member 16. The first and second reinforcement members 12 and 14 and the central structural member 16 extend in the x-direction to a comparable length.

The central structural member 16 includes a stack of flat, elongated beam chords. The central structural member 16 has a predetermined depth d and thickness $t_1$ that is suitably dimensioned to resist an anticipated bending moment M, having an axis of orientation approximately directed in a z-direction. Each beam chord in the stack includes multiple plies of reinforcing fibers in a polymer matrix. The fibers in at least some of the plies have an orientation of ±α degrees relative to the x-axis. The reinforcing fibers may include, for example, glass fibers, aramid fibers, boron fibers, alumina fibers and silicon carbide fibers. In one particular embodiment, however, the reinforced polymer-based material includes a plurality of carbon fibers that are embedded in a high performance epoxy compound to impart a high structural stiffness to the structural member 10.

The beam assembly 10 has a plurality of apertures 18 that extend through the reinforcement members 12 and 14 and the central structural member 16. The apertures 18 and 20 are suitably sized to accommodate a plurality of bolts 22. A predetermined torque is imparted to the bolts 22 and corresponding nut portions 24 to cooperatively impart a predetermined compressive force in a z-direction to the central structural member 16. The reinforcement members 12 and 14 distribute the compressive force. In some embodiments, the bolts 22 may be tightened to 40-60% of maximum bolt tension.

Figure 5:
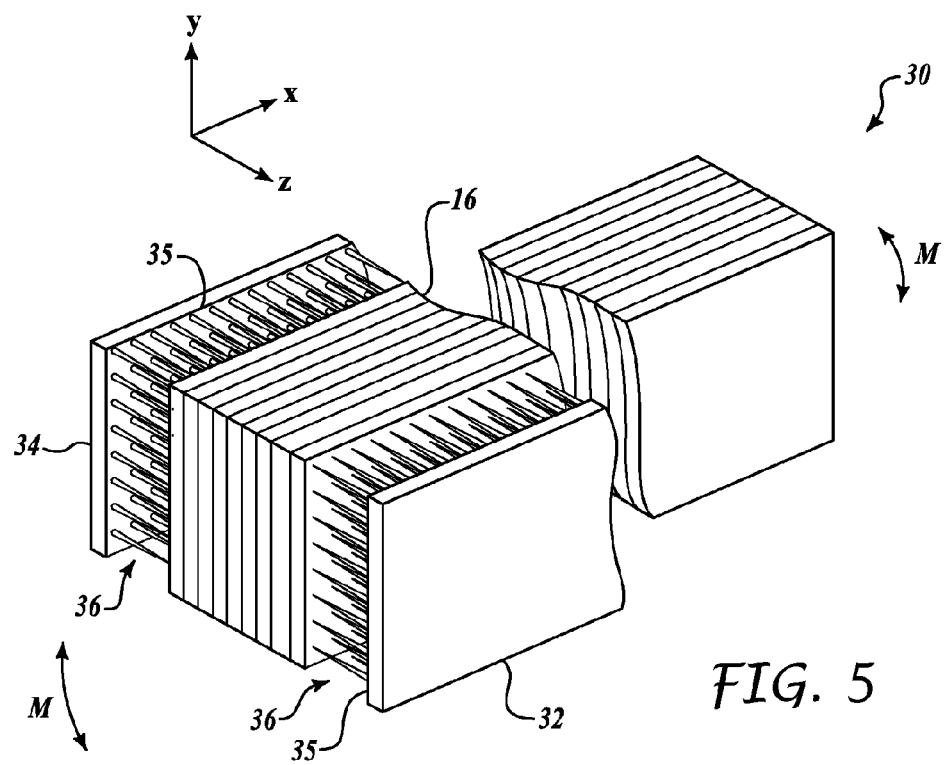
FIG. 5 is a partial exploded isometric view of a beam assembly that is reinforced by z-pins.

FIG. 5 illustrates a beam assembly 30 including first and second reinforcement members 32 and 34 and a plurality of z-pin members 36 extending outwardly from respective contacting surfaces 35 of the first and second reinforcement members 32 and 34. In one particular embodiment, the z-pin members 36 are embedded into the central structural member 16 as described in detail in U.S. Pat. No. 4,808,461 to Boyce, et al. and entitled "Composite Structure Reinforcement" (z-pin members 36 are excited with ultrasound energy as the members 34 are impressed into the central structural member 16). In addition to the z-pin members 36, other fasteners (not shown in FIG. 5) that extend through the members 16, 32 and 34 may be used to provide additional reinforcement at selected portions of the beam assembly 30 and/or to permit the beam assembly 30 to be coupled to other external structures.

A beam assembly can be formed from a single beam chord or multiple beam chords. A beam assembly formed from multiple beam chords is illustrated in FIGS. 6 and 7.

Figure 6:
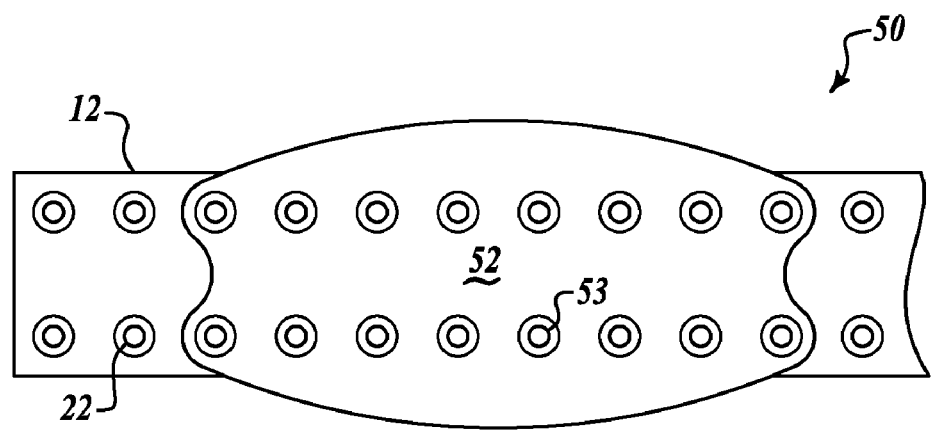
FIG. 6 is side view of a beam chord splice.
Figure 7:
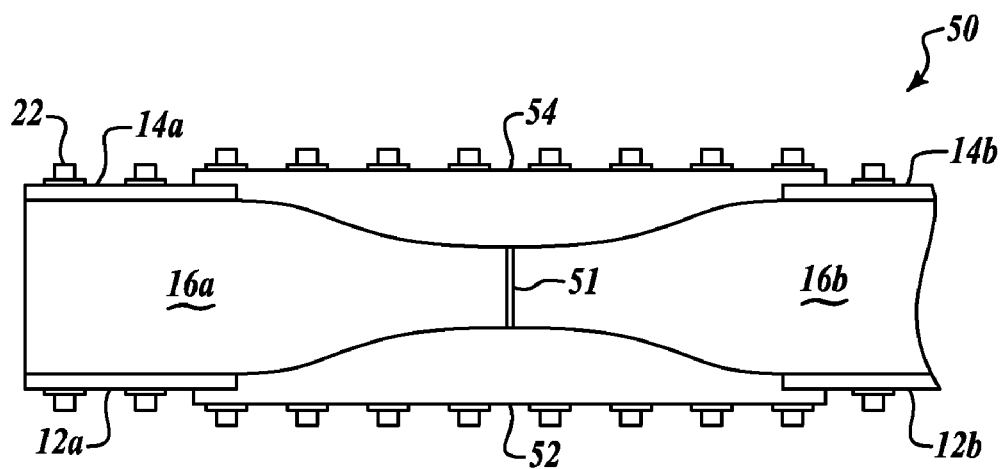
FIG. 7 is a top view of the beam chord splice of FIG. 6.

Reference is now made to FIGS. 6 and 7, which illustrate a beam assembly 50 including a first central structural chord 16a and a second central structural chord 16b that are spliced together. Each chord 16a and 16b includes plies of reinforcing fibers oriented at ±α degrees relative to the segment's longitudinal axis. The first central structural chord 16a is clamped between first and second reinforcement plates 12a and 14a. The second central structural chord 16b is clamped between first and second reinforcement plates 12b and 14b. A first splicing plate 52 is positioned on the first reinforcement plates 12a and 12b. Apertures 53 in the first splicing plate 52 are aligned with through-holes in the central structural chords 16a and 16b as well as apertures in the reinforcement plates 12a and 12b. A second splicing plate 54 is correspondingly positioned on the second reinforcement plates 14a and 14b. Apertures 53 in the second splicing plate 54 are in alignment with through-holes in the central structural chords 16a and 16b and apertures in the reinforcement plates 12a and 12b. Bolts 22 may be inserted through the first splicing plate 52 and the second splicing plate 54, and secured by nut portions 24, so that the chords 16a and 16b are spliced together. A taper block 51 may be positioned at the interface between the spliced segments 16a and 16b in order to provide integrity to the interface. The taper block 51 and splicing plates 52 and 54 may be made of metal or carbon graphite.

Figure 8:
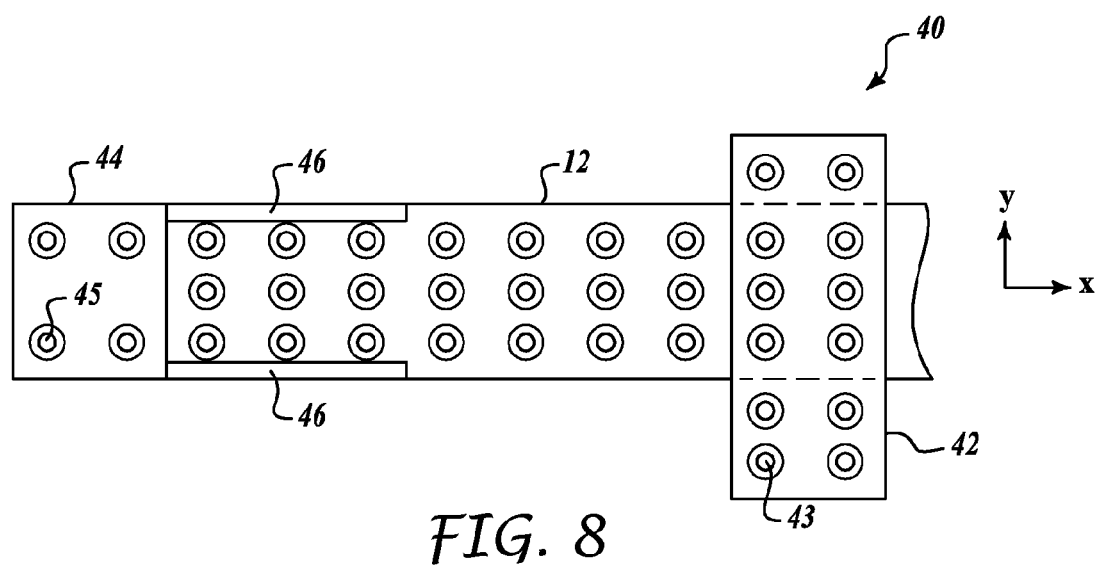
FIG. 8 is a partial elevation view of a structural or system joint.
Figure 9:
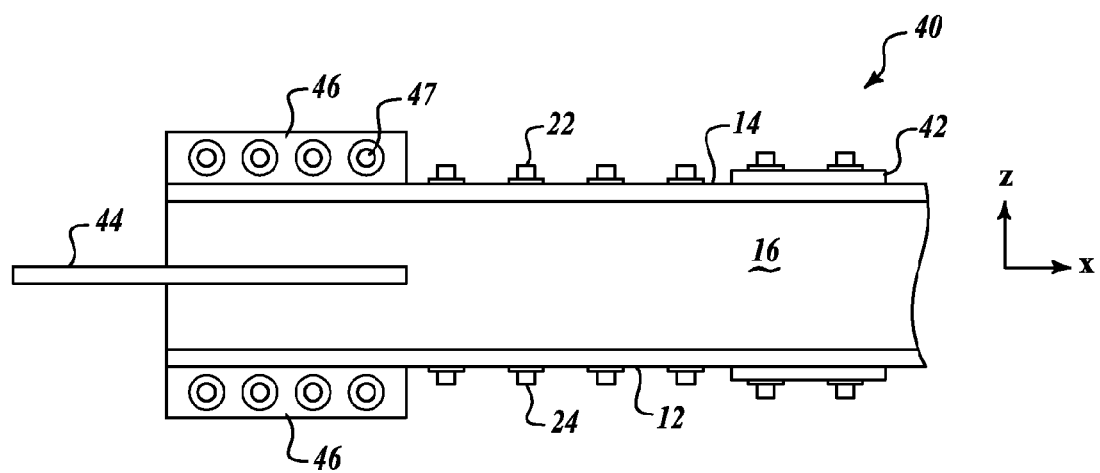
FIG. 9 is a partial plan view of the structural or system joint of FIG. 8.

Reference is now made to FIGS. 8 and 9, which illustrate a structural or system joint including attachment plates 42, 44 and 46 for connecting a beam assembly 40 to other structures. A transverse attachment plate 42 is positioned between the beam chord 16 and either the first or second reinforcement plate 12 or 14 by forming a receiving lateral cutout portion in the beam chord 16. The transverse attachment plate 42 is secured to the beam chord 16 by fasteners 22 that project through the beam chord 16 and the second reinforcement member 14. Alternately the transverse attachment plate 42 may be secured to an exterior surface of either the first or second reinforcement plate 12 or 14 so that a receiving cutout portion in the beam chord 16 is not required.

A longitudinal attachment plate 44 is positioned within a longitudinal cutout portion that extends inwardly from an end portion of the beam assembly 40. The longitudinal attachment plate 44 is similarly coupled to the composite beam by the fasteners 22, which extend through the beam chord 16.

An angled attachment plate 46 is positioned between the beam chord 16 and the first or second reinforcement plate 12 or 14 by forming a receiving lateral cutout portion in the beam chord 16. The angled attachment plate 46 may be fastened to the beam 40 by fasteners 22 that extend through the beam 40. Alternately the angled attachment plate 46 may be coupled to an exterior surface of either the first or second reinforcement plate 12 or 14 so that a receiving cutout portion in the beam chord 16 is not necessary.

The attachment plates 42, 44 and 46 may also include apertures 43, 45 and 47, respectively. These apertures 43, 45 and 47 may be used to couple the beam assembly 40 to other external structural portions.

A structure herein is especially useful for aerospace vehicles. An example of an aerospace vehicle is illustrated in FIG. 10*a*.

Figure 10A:
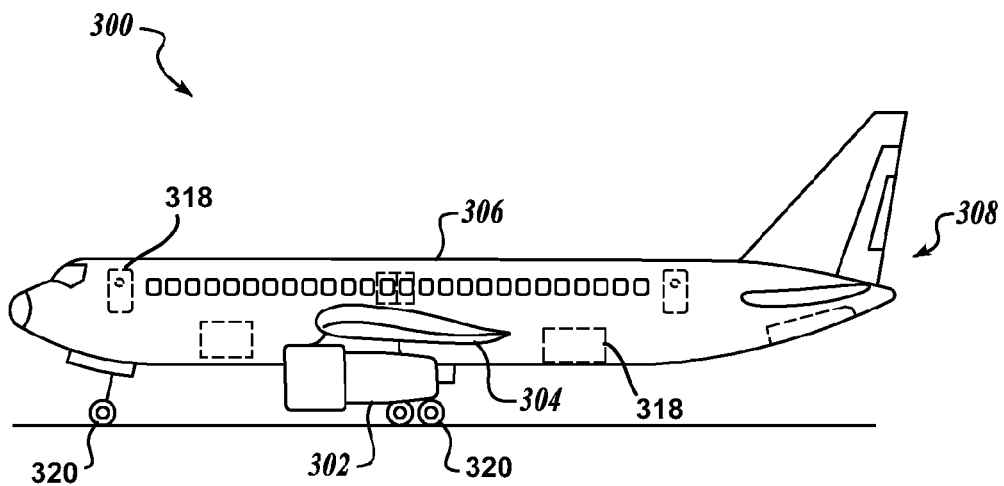
FIGS. 10a and 10b are illustrations of an aircraft that incorporates one or more composite beam chords clamped between reinforcement plates.

Reference is now made to FIG. 10*a*, which illustrates a commercial aircraft 300. The aircraft 300 includes a fuselage 306, wing assemblies 304, and empennage 308. One or more propulsion units 302 are coupled to the wing assemblies 304, or fuselage 306 or other portions of the aircraft 300. The aircraft 300 also includes landing gear 320.

Figure 10B:
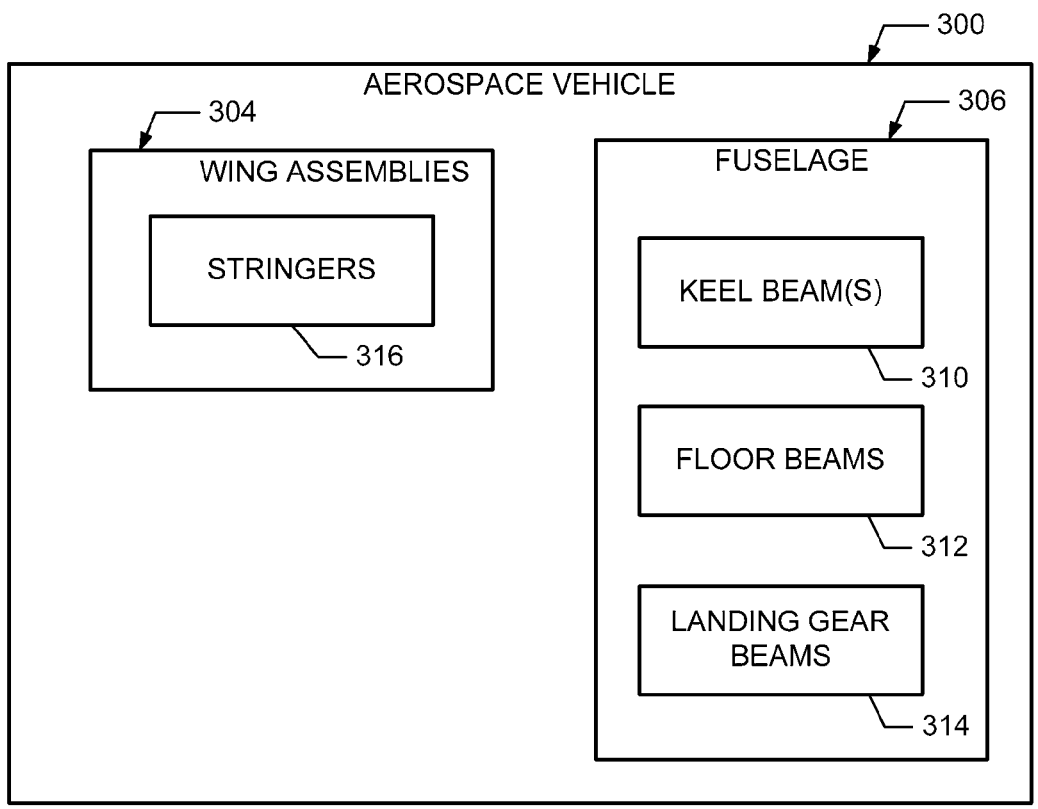

Additional reference is made to FIG. 10*b*, which identifies specific aerospace structures that can benefit from a composite beam chord clamped between reinforcement plates. The fuselage 306 includes one or more keel beams 310 (e.g., a fore keel beam and an aft keel beam), which are longitudinally oriented structural members that impart flexural stiffness to the fuselage 306, particularly where landing gear 320 is located and where the wing assemblies 304 are joined to the fuselage 306.

A keel beam 310 may have a single composite beam chord or it may have multiple (e.g., three) beam chords that are spliced together. For example, the splicing plates 52 and 54 may be used to splice the keel beam chords together. The tapered block 51 may be tapped into the space between the keel beam chords, picking up any gaps remaining due to manufacturing tolerances. The keel beam may be connected to other aircraft frame members using connection plates such as those illustrated in FIGS. 8 and 9.

Substantial weight savings can be realized by the keel beam 310. The keel 310 beam weighs 50% less than a keel beam fabricated from aluminum or titanium. In addition, the combination of the α-oriented fibers and the bolt clamping yields a beam chord that is about twice as strong in compression upon impact as a traditional composite beam.

A keel beam 310 has been built and tested to stress levels exceeding 90 ksi under service conditions. The composite beam chord used reinforcing fibers having a modulus of 42 MSI. Plies of the fibers were oriented at $\alpha=5$ degrees and $\beta=65$ degrees. The composite chord was allowed to strain up to 6,000 microinches. Two clamped aluminum plates prevented delamination. Density of the keel beam is under 0.06 lbs/in$^3$.

By contrast, an all-aluminum chord will not exceed 60 ksi when limited under service conditions to 6000 microinch strain, and its density is 0.10 lbs/ft$^3$. Consequently, total strength to weight advantage of a graphite keel beam herein is about 2.5. This can result in 200-300 lbs weight savings for a mid-size jetliner.

The reinforcement plates offer benefits in addition to providing protection against impact damage, improving load transference properties, increasing strength in compression, and suppressing delamination. The reinforcement plates provide a path for current return network, lightning strike and electrostatic dissipation. The lighting path is especially valuable for a fuselage 306 made primarily of composite material.

The reinforcement plates also provide a ground plane for electronic equipment. If the keel beam 310 is provided with a grid of apertures, the grid could be used to secure many different pieces of equipment to the keel beam 310.

Still referring to FIG. 10*b*, the fuselage 306 further includes landing gear beams 314. A landing gear beam 314 typically extends between a rear spar of a wing assembly 304 and the fuselage 306. The landing gear 320 includes a truck attached to a strut. At the top of the strut are trunnions, which are attached to the rear spar and also the landing gear beam. 314. The landing gear beam 314 transfers landing gear loads from the wing assembly 304 to the fuselage 306.

Figure 10C:
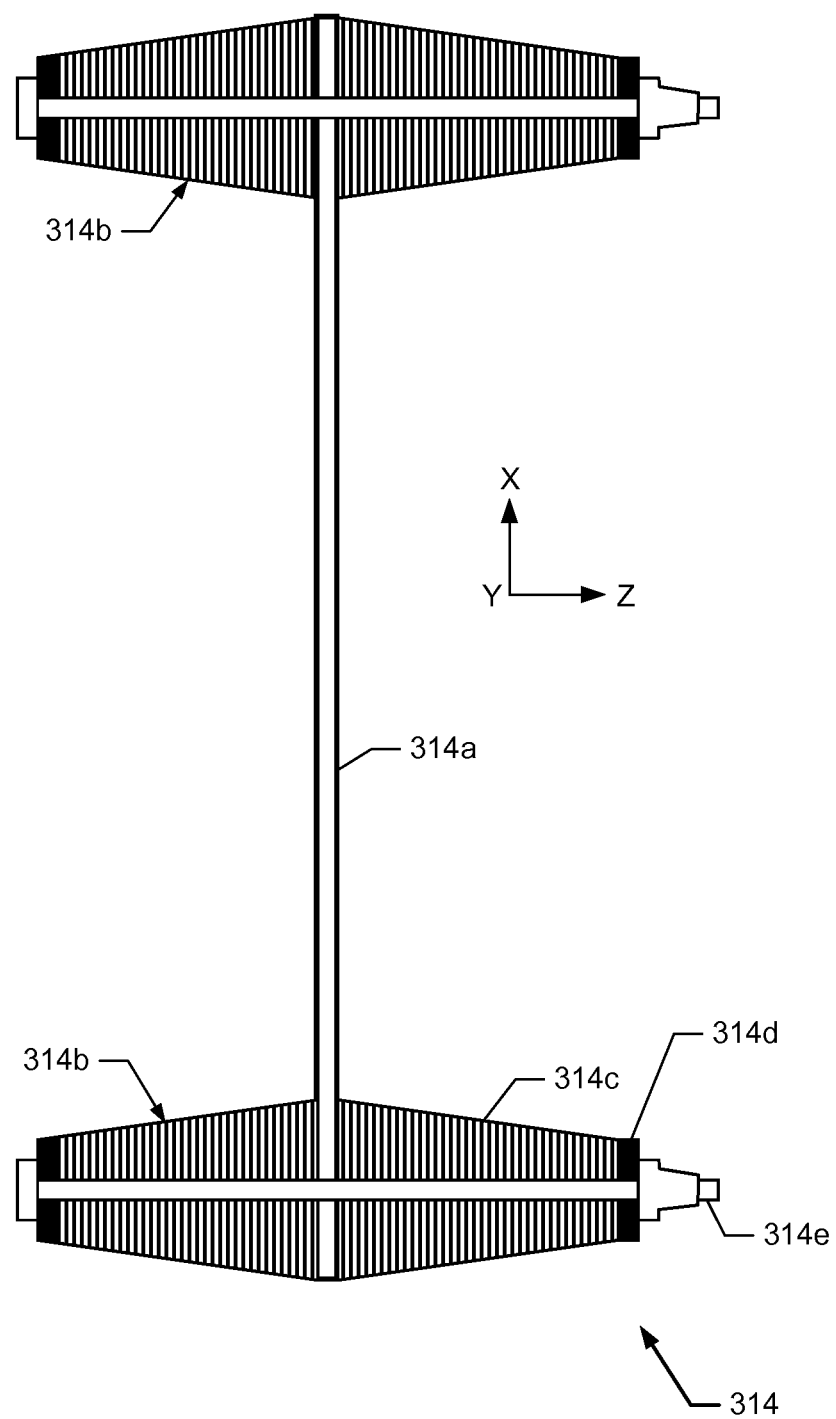
FIG. 10c is an illustration of a landing gear beam including composite beam chords clamped between reinforcement plates.

Reference is now made to FIG. 10*c*, which illustrates a transverse cross section of the landing gear beam 314. The landing gear beam 314 extends longitudinally in the Y-direction. The landing gear beam 314 is not limited to any particular cross section. The transverse cross-section illustrated in FIG. 10*c* is but one example.

The landing gear beam 314 of FIG. 10*c* includes a shear web 314*a* and first and second end caps 314*b*. The shear web 314*a* is made of a composite material. Each end cap 314*b* includes stacks of graphite plates 314*c* on opposite sides of the shear web 314*a*, and reinforcement plates 314*d* on opposite ends of the stacks. The stacks of plates 314*c*, the shear web 314*a* and the reinforcement plates 314*d* are clamped together by a bolt 314*e*.

Reference is once again made to FIG. 10*b*. The fuselage 306 further includes floor beams 312. The floor beams 312 are transversely oriented structural members that that extend from one side of the fuselage 306 to the other side. The floor beams 312 support floor panels, seats and other interior components. The floor beams 312 are subject to large bending loads. Each floor beam 312 may also include a shear web and end caps that are clamped in the same manner as the landing gear beam 314.

Each wing assembly 304 includes wing stringers 316, which are longitudinally-oriented structural members attached to ribs. The stringers 316 perform several functions, including transferring bending loads in the upper and lower wing skin panels, and stiffening the wing skin panels so the panels don't buckle under loading. A wing box includes upper and lower stringers. The upper stringers are subject to uniaxial compression, while the lower stringers are subject to uniaxial tension. Each wing stringer 316 may also include a shear web and end caps that are clamped in the same manner as the landing gear beam 314.

The landing gear beams 314, floor beams 312, and wing stringers 316 are not limited to any particular geometry. Examples of geometries include, but are not limited to I-beams, Z-beams, blades, C-channels, and hat beams.

The beams chords for the landing gear beams 314, floor beams 312, and wing stringers 316 are all uniaxially loaded. The end caps of the landing gear beams 314, floor beams 312, and wing stringers 316 may all include plies of reinforcing fibers oriented at $\alpha$ between 2 and 12 degrees. The end caps may also include plies of reinforcing fibers oriented at $\beta$ (e.g., 65 degrees) for increased bearing strength and lateral stiffness. For the wing stringers 316, which might require higher lateral bending stiffness, the value of $\beta$ could be increased to 75 degrees.

The reinforcement plates increase working stresses from 50 ksi (for beams that are 100% carbon fiber reinforced plastic) to 80 or 90 ksi. The combination of composite beam chords and reinforcement plates is substantially (about 50%) lighter than an all-metal structure. Reducing the weight will greatly reduce vehicle operating costs (e.g., fuel costs).

Figure 11:
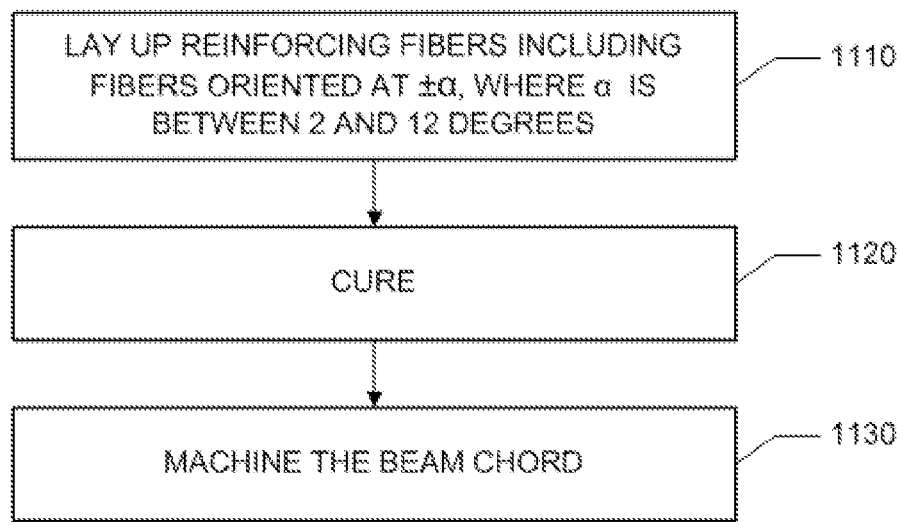
FIG. 11 is an illustration of a method of fabricating a composite beam chord.

Reference is once again made to FIG. 10*a*. An aerospace structure herein is not limited to a keel beam 310, floor beam 312, landing gear beam 314 or wing stringer 316. For instance, an aerospace structure herein could be used as a frame doubler ring around passenger and cargo doors 318. The reinforcement plates provide added protection against impacts from passenger and cargo loaders Reference is now made to FIG. 11, which illustrates a method of manufacturing a composite beam chord. At block 1110, a first drill breakout ply (e.g., a first cloth) is placed on a tool (e.g., mandrel or mold tool), plies of reinforcing fibers are laid up on the cloth, and a second drill breakout ply (e.g., a second cloth) is placed on the top ply. Fibers in at least some of the plies have an orientation of $\pm\alpha$ degrees with respect to the longitudinal axis, where $\alpha=2$ to 12 degrees and preferably 3 to 5 degrees. The lay-up may also include laying up plies of fibers at other angles, such as $+\beta$ and $-\beta$ degrees.

As a first example, only plies of fibers at $\pm\alpha$ degrees are laid up. As a second example, one or more plies at $\pm\alpha$ and $\pm\beta$ degrees may be laid up. Of the total fibers oriented at $\pm\alpha$ and $\pm\beta$ degrees, only 20% of fibers at $\pm\beta$ degrees may be used to reach bearing strength levels similar to traditional 0/45/90 degree plies in the lengthwise direction. More generally, 0% to 40% of all reinforcing fibers in the beam may be oriented at $\pm\beta$ degrees.

In some embodiments, each ply may be a unidirectional tape with fibers oriented at $\pm\alpha$ degrees with respect to a longitudinal axis of the tape. These tapes are dispensed on the tool and rotated to the correct angle (e.g., $+\alpha$). As a result, some of the tape may overhang the tools. The overhanging portions can eventually be cut off (for instance, after curing).

In other embodiments, "cartridges" may be laid up. Cartridges may include pre-packaged plies having the correct fiber orientation (e.g., $+\alpha$ and $-\alpha$) with respect to the cartridge's longitudinal axis. Such cartridges can be dispensed on the tool without overhang. For example, the cartridge can be dispensed with its longitudinal axis parallel to the longitudinal axis of the tool.

In some embodiments, a cartridge may include two plies that are stitched together. One ply may have fibers oriented at $+\alpha$ degrees and the other ply may have fibers oriented at $-\alpha$ degrees. Both plies have the correct fiber orientation with respect to the cartridge's longitudinal axis.

The fibers may be balanced or slightly unbalanced. As an example of balanced fibers, a structure has N plies of fibers at $+\alpha$ interspersed with N plies of fibers at $-\alpha$. As an example of slightly unbalanced fibers, a structure may have N plies of fibers at $+\alpha$ interspersed with N$-1$ plies of fibers at $-\alpha$ degrees.

In some embodiments, all plies may have the same value of $+\alpha$ and the same value of $-\alpha$. In other embodiments, the fibers may have different values of $-\alpha$. For instance, plies of reinforcing fibers having orientations of $\alpha=3$ degrees and $\alpha=5$ degrees may be laid up.

In some embodiments, a ply may have fibers at different angles. For example, a ply may include fibers oriented at angles of $-3$ degrees, $+7$ degrees, $-7$ degrees, and $+2$ degrees.

In some embodiments, a weave may be dispensed instead of unidirectional tape. Unlike tapes, which have no crimp, the fibers in weaves are crimped. And unlike tapes, a single weave can have fibers oriented at $+\alpha$ degrees and fibers oriented at $-\alpha$ degrees.

At block 1120, the layup is cured. A matrix (e.g., a thermoplastic or thermoset) can be added before, after or while the plies are either laid up or being cured.

At block 1130, the cured beam chord is machined. For example, fastener holes or other types of holes may be drilled into the cured beam chord. The holes may be drilled while the structure is on the tool, or after the beam chord has been removed from the tool. The holes may be roughly perpendicular to the plies. The drill breakout plies prevent the fibers in the surface plies from peeling away.

The beam chord may also be saw cut. The saw cut exposes the ends of a plurality of fibers.

Figure 12:
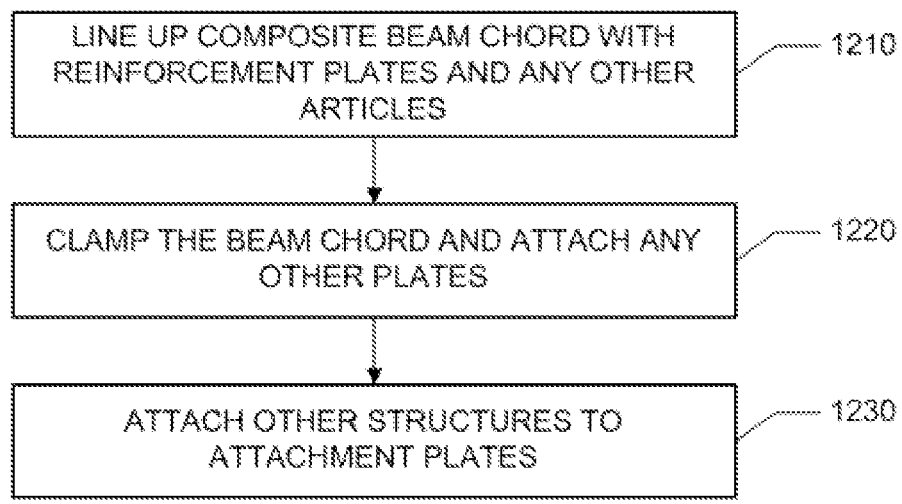
FIG. 12 is an illustration of a method of assembling a structure including a composite beam chord and reinforcement plates.

Reference is now made to FIG. 12, which illustrates a method of assembling at least one composite beam chord. At block 1210, holes in the beam chord are lined up with reinforcement plates and any other plates (e.g., splice plates and attachment plates). At block 1220, fasteners are inserted through holes and pre-tensioned, whereby the beam chord is clamped between the reinforcement plates. Other plates are also attached. At block 1230, other structures (e.g., beams, devices) are secured to the attachment plates.

The invention claimed is:

1. A structure for an aerospace vehicle, the structure comprising:
    first and second metal plates; and
    a beam chord permanently clamped between the first and second metal plates at a force that precludes or reduces delamination of the beam chord under axial loading during operation of the vehicle, the beam chord having a longitudinal axis and comprising a plurality of plies of reinforcing fibers extending in an x-y plane, wherein the reinforcing fibers of at least 60 percent of the plies of the plurality of plies are oriented at $\pm\alpha$ degrees with respect to the longitudinal axis, where $\alpha$ is from 2 to 12 degrees.

2. The structure of claim 1, wherein holes are drilled through the plurality of plies in a z-direction; and wherein fasteners extend through the holes to clamp the plates to the beam chord.

3. The structure of claim 2, wherein the fasteners include pre-tensioned bolts.

4. The structure of claim 1, wherein the plurality of plies comprises plies having the reinforcing fibers oriented at $\pm\beta$ degrees with respect to the longitudinal axis, where $\beta$ is between 15 and 85 degrees.

5. The structure of claim 1, wherein the composite beam chord includes carbon fibers in a polymer matrix.

6. The structure of claim 1, wherein the plates are aluminum or titanium plates.

7. The structure of claim 1 further comprising at least one attachment plate positioned between the beam chord and at least one of the first and second reinforcement plates, the attachment plate including a plurality of apertures for attaching to external structures.

8. The structure of claim 1, further comprising:
    a second beam chord clamped between third and fourth metal plates at a force that precludes or reduces delamination of the second beam chord under axial loading during operation of the vehicle; and a splicing plate for splicing the first and second beam chords together; and a plurality of fasteners extending through the splicing plate and the first and second beam chords.

9. The structure of claim 1, wherein the structure is an aircraft keel beam.

10. The structure of claim 1, wherein the beam chord is elongated along the longitudinal axis and has a first longitudinal length, wherein the first metal plate has a second longitudinal length, and wherein the first longitudinal length is substantially the same as the second longitudinal length.

11. An aerospace structure comprising a shear web and first and second end caps for the shear web, each end cap including the beam chord and plates of claim 1.

12. The aerospace structure of claim 11, wherein each beam chord includes stacks of composite plates on opposite sides of the shear web, wherein the plates are at opposite ends of the stacks, and wherein the shear web, stacks and plates are clamped together.

13. The structure of claim 11, wherein the structure is a wing stringer.

14. The structure of claim 11, wherein the structure is a landing gear beam.

15. The structure of claim 11, wherein the structure is a floor beam.

16. An aerospace vehicle comprising a fuselage, and wing assemblies coupled to the fuselage, at least one of the fuselage and the wing assemblies including a structure having first and second plates, a beam chord between the plates, and fasteners for clamping the beam chord between the plates at a force that precludes or reduces delamination of the beam chord under axial loading during operation of the vehicle, the beam chord having a longitudinal axis and comprising a plurality of plies of reinforcing fibers extending in an x-y plane, wherein the reinforcing fibers of at least 60 percent of the plies of the plurality of plies are oriented at $\pm \alpha$ degrees with respect to the longitudinal axis, where $\alpha$ is from 2 to 12 degrees.

17. The vehicle of claim 16, wherein the structure is a fuselage keel beam.

18. The vehicle of claim 16, wherein the structure is a fuselage floor beam.

19. The vehicle of claim 16, wherein the structure is a wing assembly stringer.

20. The vehicle of claim 16, wherein the structure is a landing gear beam.

21. A fuselage comprising a keel beam including first and second metal plates and a beam chord permanently clamped between the plates at a force that precludes or reduces delamination of the beam chord under service conditions, the beam chord having a longitudinal axis and comprising a plurality of plies of reinforcing fibers extending in an x-y plane, wherein the reinforcing fibers of at least 60 percent of the plies of the plurality of plies are oriented at $\pm \alpha$ degrees with respect to the longitudinal axis, where $\alpha$ is from 2 to 12 degrees.

* * * * *